(12) United States Patent
Mari et al.

(10) Patent No.: US 8,044,527 B2
(45) Date of Patent: Oct. 25, 2011

(54) ELECTRIC POWER GENERATION WITH MAGNETICALLY GEARED MACHINE

(75) Inventors: Jorge Mari, Bavaria (DE); Michal-Wolfgang Waszak, Bavaria (DE); Simon Schramm, Munich (DE)

(73) Assignee: General Electric Company, Niskayuna, NY (US)

( * ) Notice: Subject to any disclaimer, the term of this patent is extended or adjusted under 35 U.S.C. 154(b) by 912 days.

(21) Appl. No.: 11/861,759

(22) Filed: Sep. 26, 2007

(65) Prior Publication Data

US 2009/0079191 A1    Mar. 26, 2009

(51) Int. Cl.
*F03D 9/00* (2006.01)
*H02P 9/04* (2006.01)

(52) U.S. Cl. .................................. 290/44; 290/55
(58) Field of Classification Search .............. 290/43, 290/44, 54, 55; 322/37
See application file for complete search history.

(56) References Cited

U.S. PATENT DOCUMENTS

| | | | |
|---|---|---|---|
| 6,924,627 B1 | 8/2005 | Wobben | |
| 6,943,462 B2 | 9/2005 | Wobben | |
| 7,071,579 B2* | 7/2006 | Erdman et al. | 290/55 |
| 7,095,597 B1* | 8/2006 | Cousineau | 361/20 |
| 7,205,676 B2* | 4/2007 | Ichinose et al. | 290/44 |
| 7,518,256 B2* | 4/2009 | Juanarena et al. | 290/44 |
| 2007/0186692 A1 | 8/2007 | Waszak et al. | |

OTHER PUBLICATIONS

C. Grantham, "Steady state and transient analysis of self excited induction generators," IEEE Procedure, vol. 136, Pt B, No. 2, Mar. 1989, pp. 61-68.
D. Seyoum et al., "The dynamics of an isolated self excited induction generator driven by a wind turbine," 27th IEEE Conf, IEEE Ind Electrical Society, IECON 01, Denver, USA, Dec. 2001, pp. 1364-1369.
B. Singh, "Jain Performance characters and optimum utility of a cage machine as a capacitor excited induction generator," IEEE Trans on energy conversion, vol. 5, Section (4), Dec. 1990, pp. 679-684.
Muljadi et al., Investigation of self excited induction generators for wind turbine applications, IEEE Proc 1, 1999, pp. 509-515.
D. Seyoum et al., The Dynamic Characteristics of an Isolated Self-Excited Inductor Generator Driven by a Wind Turbine, IEEE Transactions on Industry Applications, vol. 39, No. 4, Jul./Aug. 2003.
G. Raina, Wind Energy Conversion Using a Self-Excited Induction Generator, IEEE Transactions on Power Apparatus and Systems, vol. PAS-102, No. 12, Dec. 1983, p. 3933.

* cited by examiner

*Primary Examiner* — Nicholas Ponomarenko
(74) *Attorney, Agent, or Firm* — Ann M. Agosti

(57) ABSTRACT

A power generation system includes: a prime mover; an electrical machine coupled to the prime mover and configured for converting mechanical power to electrical power, the electrical machine having a power factor of less than or equal to 0.7; a reactive power supply assembly coupled to the electrical machine and configured to supply reactive power to the electrical machine; and a power electronic converter coupled to the reactive power supply assembly and configured for transferring power from the electrical machine to a grid.

24 Claims, 9 Drawing Sheets

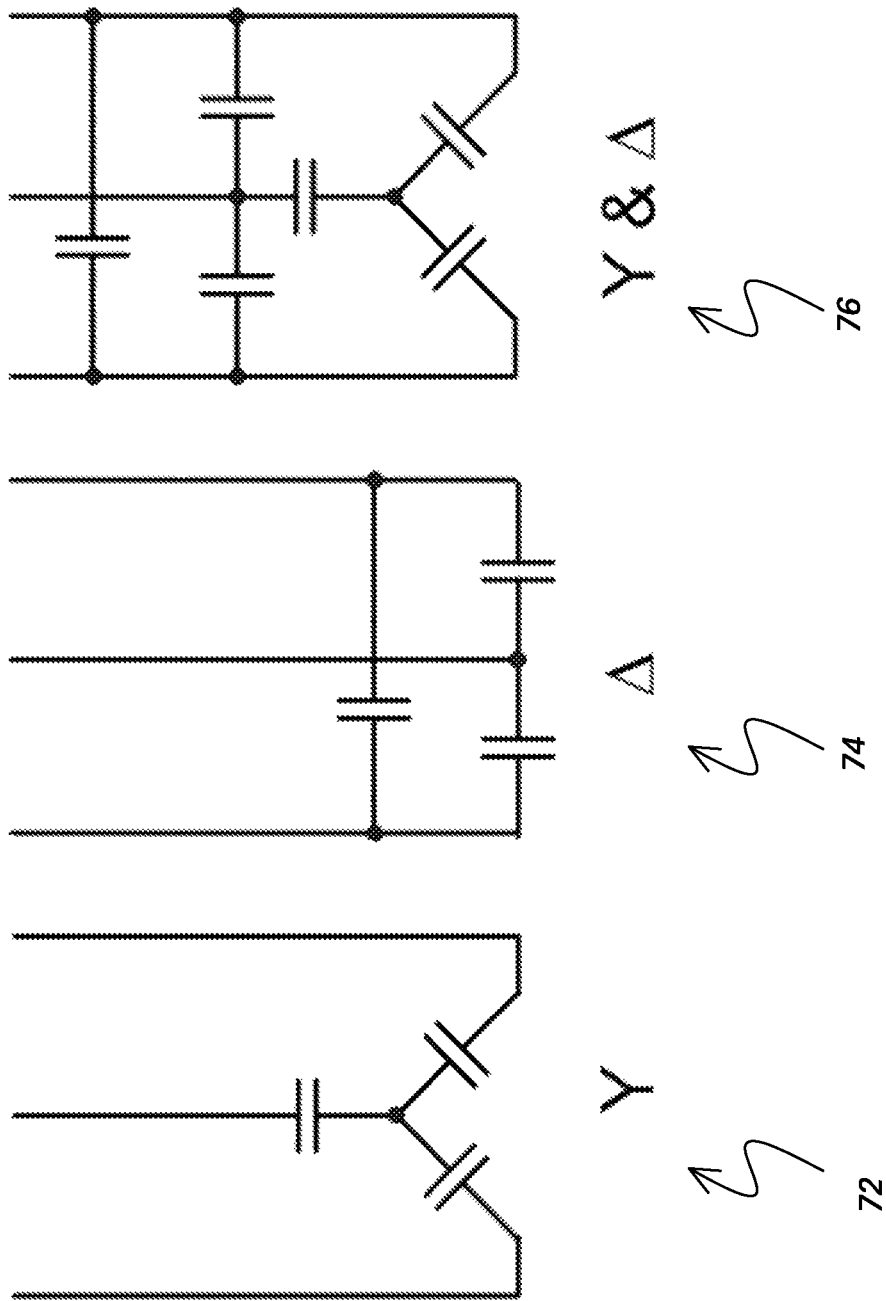

ELECTRIC POWER GENERATION WITH MAGNETICALLY GEARED MACHINE

BACKGROUND

The present disclosure relates generally to electric power generation and more particularly to electric power generation systems including magnetically geared machines.

Electrical machines such as motors and generators typically deliver more power at high speeds than at low speeds. In order to adapt a high-speed, rotating electrical machine to a high-torque, lower speed mechanical component (such as a prime mover in the case of a generator or a load in the case of a motor), mechanical gear boxes are typically selected because the cost of having a high-speed electrical machine coupled with mechanical gearing for speed/torque conversion is lower than the cost of a low-speed electrical machine. Mechanical gearing has some inherent disadvantages with respect to acoustic noise, vibration, reliability, and maintenance, for example.

Magnetic gears do not require physical contact between an input shaft and an output shaft but have traditionally received relatively little attention in the industry due to design complexities and limitations on torque density. For example, a magnetic gear assembly arranged in a spur configuration results in only a small fraction of the permanent magnets located on the gears actually contributing to torque conversion at any given time.

In commonly assigned U.S. 20070186692, a machine includes a moveable rotor having a first magnetic field associated therewith, a stator configured with a plurality of stationary stator windings therein, and a magnetic flux modulator interposed between the moveable rotor and the stator windings. The magnetic flux modulator is configured to transmit torque between the first magnetic field associated with the moveable rotor and a second magnetic field excited by the plurality of stationary stator windings. Such magnetically geared generators are capable of generating electric power from a prime mover under conditions of low speed and high torque and doing so without the need of a gearbox or speed adapter. However, due to flux leakage and magnetic coupling challenges, magnetically geared generators have higher reactance and lower induced emf than most conventional generators as well as an intrinsically low power factor (for example, below 0.7 or even more typically in the range of 0.2 to 0.5).

It would be desirable to have a technical and cost effective method of obtaining the benefits of magnetically geared generators while overcoming the aforementioned power factor drawback.

BRIEF DESCRIPTION

In some power generation systems, a generator comprising a synchronous machine is used. Synchronous machines have power factors higher than power factors of magnetically geared machines or even power factors adjustable to high values (e.g. 1.0) as in the case of separately excited field windings. Such synchronous machine systems may require power adjustment features on the grid side. In U.S. Pat. No. 6,943,462, for example, a capacitor bank is used to impress a capacitive current into a directly-driven generator stator (with the capacitive current producing a part of the exciter power of the generator) and to provide harmonic power to a rectifier situated downstream of the generator. In U.S. Pat. No. 6,924,627, as another example, a compensation device is described as regulating reactive power supplied to a consumer (grid) by adjusting power phase, amplitude, or frequency. The compensation device is described as including an inverter and a voltage or current sensor and as being regulated for producing capacitive reactive power which is then supplied to the grid. These systems do not offer the low speed and high torque operational advantages of magnetically geared generator systems.

In contrast, in accordance with one embodiment disclosed herein, a power generation system comprises: a prime mover, an electrical machine coupled to the prime mover, a reactive power supply assembly coupled to the electrical machine, and a power electronic converter coupled, on one side, to the reactive power supply assembly and the electrical machine and, on the other side, a grid. The electrical machine is configured for converting mechanical power to electrical power and has a power factor of less than or equal to 0.7. The reactive power supply assembly is configured to supply reactive power to the electrical machine. The power electronic converter is configured for transferring power from the electrical machine to a grid.

In accordance with another embodiment disclosed herein, a power generation system comprises: a wind driven turbine; a magnetically geared generator coupled to the wind driven turbine; a reactive power supply assembly coupled to the magnetically geared generator and configured to supply reactive power to the electrical machine; and a power electronic converter coupled to the reactive power supply assembly and configured for transferring power from the magnetically geared generator to a grid.

In accordance with another embodiment disclosed herein, a power generation system comprises a prime mover, a magnetically geared generator coupled to the prime mover, and a power electronic converter configured for transferring active power from the magnetically geared generator to a grid and for supplying reactive power to the magnetically geared generator.

DRAWINGS

These and other features, aspects, and advantages of the present invention will become better understood when the following detailed description is read with reference to the accompanying drawings in which like characters represent like parts throughout the drawings, wherein:

FIGS. 12-14 are circuit diagrams of example capacitor configurations for use in the embodiment of FIG. 1.

DETAILED DESCRIPTION

Figure 1:
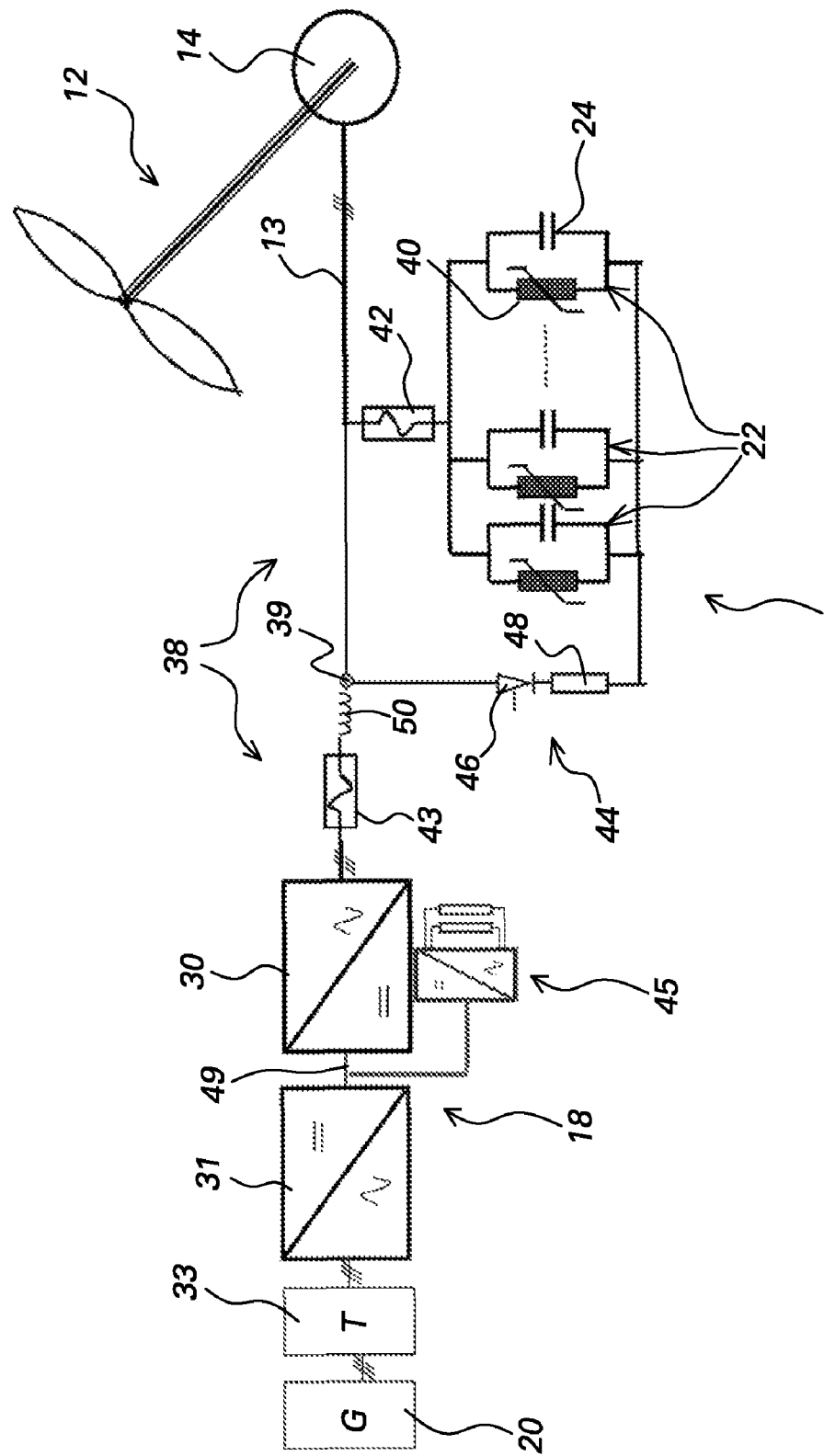
FIG. 1 is a single line block diagram of a power generation system in accordance with one embodiment disclosed herein.

FIG. 1 is a single line block diagram of a power generation system 10 in accordance with one embodiment disclosed herein. Power system 10 comprises a prime mover 12, an electrical machine 14 coupled to prime mover 12, a reactive power supply assembly 16 coupled to electrical machine 14, and a power electronic converter 18 coupled to the reactive power supply assembly and configured for transferring power from the electrical machine to a grid 20. Electrical machine 14 is configured for converting mechanical power to electrical power in embodiments operating in a generating mode (such as wind or hydro turbine systems, for example) or for converting electrical power to mechanical power in embodiments operating in a motoring mode (such as ship propulsion systems, for example). Electrical machine 14 typically has a power factor of less than or equal to 0.7 and in one embodiment comprises a magnetically geared machine such as described in aforementioned US20070186692. Reactive power supply assembly 16 is configured to supply reactive power to electrical machine 14. Although embodiments will typically include three phase lines, single lines are used for purposes of illustration herein.

Figure 4:
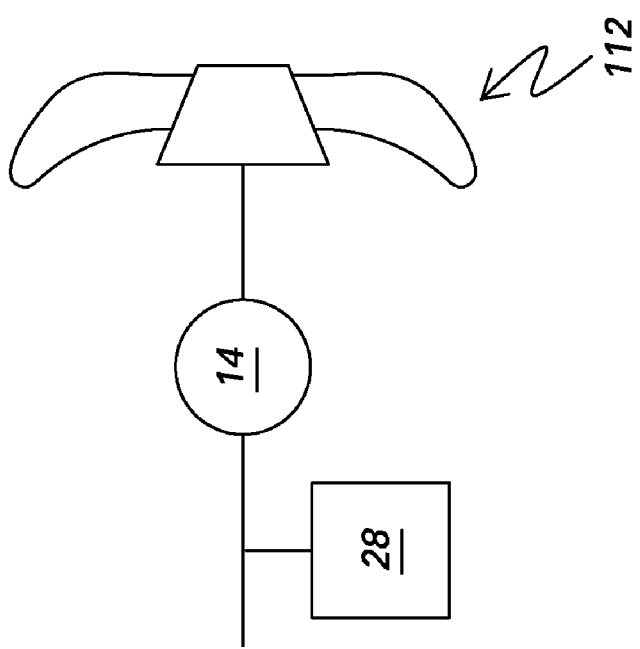

In a more specific embodiment, electrical machine 14 has a power factor ranging from 0.2 to 0.5. Although any type of low power factor electrical machine may be used, one machine expected to be particularly useful in wind turbine 12 and hydro turbine 112 (FIG. 4) embodiments is the magnetically geared machine. Another example of a low power factor machine is a vernier machine.

Embodiments disclosed herein are thought to be particularly useful for prime movers where variable sources of mechanical energy are present. For example, wind turbines experience variations in wind speed. Such systems typically operate under variable pitch conditions to address changing wind speed; however, variations in rotational speed still result. Although a magnetically geared generator is referenced with respect to FIG. 1, the disclosed concepts are also applicable to motor embodiments.

Figure 2:
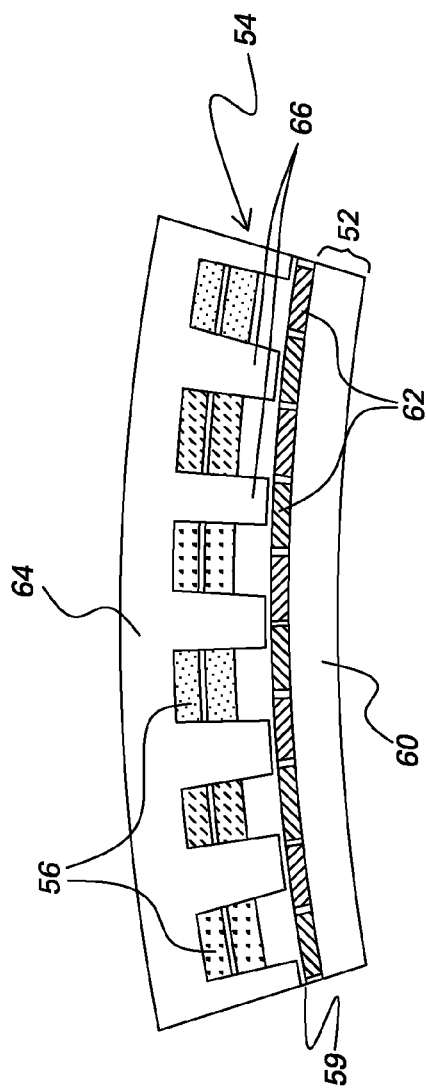
FIG. 2 is a partial block diagram of a stator and rotor that may be used in the embodiment of FIG. 1.

FIG. 2 is a partial block diagram of a stator and rotor that may be used in the embodiment of FIG. 1. As discussed above, one example of a magnetically geared generator is described in aforementioned U.S. 20070186692 wherein a multiphase AC generator includes a multi-polar permanent magnet rotor 52, a magnetic flux modulator 54, and stator windings 56. Rotor 52 comprises a core 60, which is typically laminated, and permanent magnets 62. Rotor 52 is configured for spinning synchronously with the generator shaft (not shown) and providing the main rotating magnetic flux in a single cylindrically-shaped air gap 58. Magnetic flux modulator 54 comprises a periodic-in-space static ferromagnetic structure with elements interspersed between the rotor 52 and stator 64. In one embodiment, magnetic flux modulator 54 is formed from part of stator laminations in the form of protruding teeth 66. Stator windings 56 may be of any suitable type with several examples including concentrated-winding or distributed-winding arrangements. The number of pole-pairs of the stator windings is different from the number of rotor pole-pairs and can be calculated by subtracting the number of pole-pairs of the rotor from the number of elements (teeth 66 in FIG. 2) of the magnetic flux modulator. In one embodiment, the stator phases are grouped in multiples of three and have external terminal connections.

Figure 3:
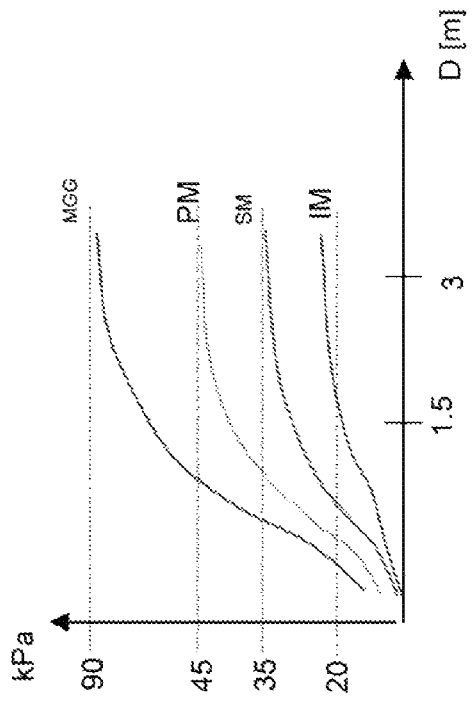
FIG. 3 is a simulated graph of torque density curves for several different types of machines.

FIG. 3 is a simulated graph of torque density entitlement curves for several different types of machines shown as IM (induction machine), SM (synchronous machine), PM (conventional permanent magnet machine), and MGG (magnetically geared machine). The graph assumes that state-of-the-art design techniques are used and include cooling embodiments and conventional ferromagnetic material selections. The IM, SM, and PM lines were generated from open literature data, and the MGG line was generated by simulation by the inventors.

When L represents an ideal stator length (the axial effective bore length), M represents the desired output torque, and D represents the bore diameter, then shear stress σ that will be required to achieve desired torque can be calculated as follows:

$$\sigma = \frac{2M}{\pi D^2 L}.$$

Shear stress is additionally a function of magnetic flux density. For example, in conventional PM machines, the following equation can be used to characterize shear stress that results from the interaction of magnetic flux:

$$\sigma = \frac{\sqrt{2} \cdot As \cdot k_{w1} \cdot B_{gm1}}{2},$$

wherein σ represents shear stress in kPa, As represents current loading in kA/m, $B_{gm1}$ represents peak of a fundamental air-gap flux density harmonic in Tesla, and $k_{w1}$ represents armature winding factor for the fundamental harmonic. $B_{gm1}$ can be calculated if peak air-gap flux density $B_g$ is known ($B_{gm1}=B_g*1.273$).

As an example, with a normal steel material of $B_g=1$ T and of current loading of 60 kA/m, the resulting shear stress is 53.8 kPa. This shear stress represents the entitlement, assuming good design conditions, that the machine has for producing torque.

For magnetically geared machines, the following equation can be used to characterize shear stress $$\sigma = \frac{\sqrt{2} \cdot As \cdot k_w \cdot J \cdot B_m}{2},$$

where $B_m$ is the magnetic flux density at the inserts, and $J=P_r/P_s$ is the gearing ratio. It is immediately seen that, because J can be much larger than 1, the MGG has the potential for developing a much greater shear stress (in other words, much greater torque density). With an average air gap diameter D of 2.4 m, $P_r=130$, $P_s=26$ in the structure of FIG. 3, the resulting shear stress is 92 kPa.

Referring back to FIG. 1, reactive power supply assembly 16 is configured to provide volt-ampere excitation required to overcome the high reactance and low power factor associated with magnetically geared generators. The magnitude of the reactive power to be provided is related to the quantity of energy involved and the rate of power delivery and return. The additional reactive power can be supplied either passively or, at higher cost, actively. One example of a passive power supply assembly is a capacitor bank 22. Examples of active power supply assemblies include synchronous machines and power electronic converters, as discussed below.

In one embodiment reactive power supply assembly 16 comprises a capacitor bank 22. In a more specific embodiment, capacitor bank 22 comprises a plurality of capacitors 24 coupled in parallel.

In an additional or alternative embodiment, at least one capacitor is coupled to at least one phase connection of machine 14. If desired, multiple capacitors may be coupled in multiple sets with each set then being coupled to a respective phase connection of machine 14 with several optional configurations 72, 74, 76 being illustrated in FIGS. 12-14 for purposes of example. Although single capacitors are shown on various phase legs, multiple capacitors may be coupled in parallel if desired.

Capacitors 24 may be coupled to machine 14 via cables or busbars 13 and an optional reactance (not shown) in series with each phase. When phase capacitors are combined with a switch-controlled converter 18, the switching of converter 18 may be used to avoid exciting electrical resonance frequencies between inductances of the system and the capacitance by closed-loop operation of the power electronic converters (using conventional voltage sensing and compensation techniques, for example).

Figure 5:
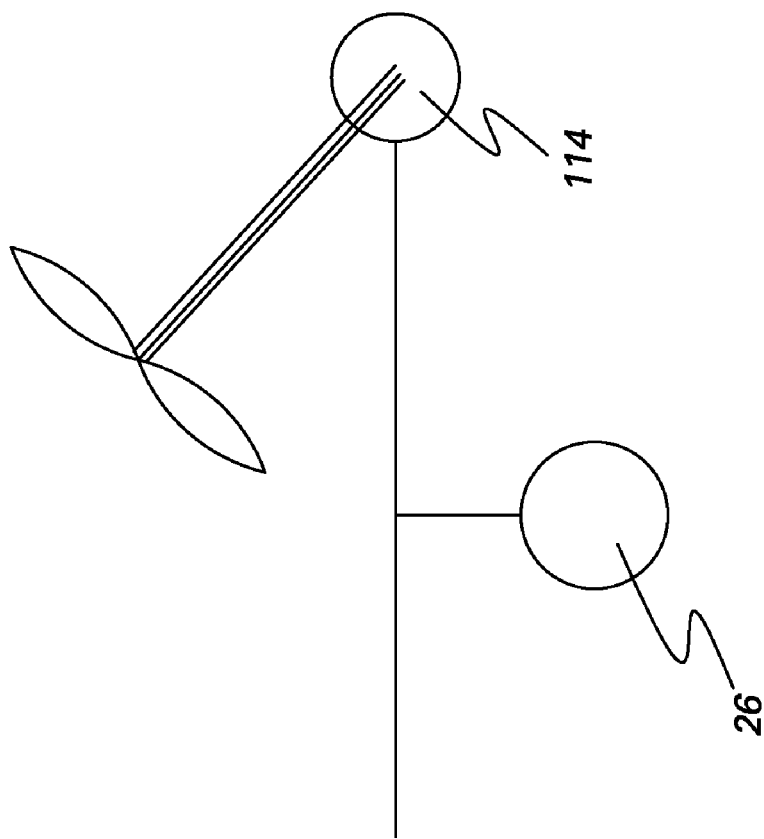
FIGS. 4-5 are block diagrams representative of several reactive power supply assemblies for the embodiment of FIG. 1.

Different types of reactive power supply assemblies may be used if desired. Two examples include an additional power electronic converter 28 (shown in FIG. 4) and a synchronous machine 26 (shown in FIG. 5). In yet another embodiment, power electronic converter 18 may be switched in a manner designed to transfer active power from the magnetically geared generator to a grid and to supply reactive power to the magnetically geared generator. Such a converter would likely need to be adapted to handle higher currents than a converter that only has the function of active power transfer.

In the embodiment of FIG. 1 power electronic converter 18 comprises an AC to DC converter 30 and is controlled by any appropriate technique. In one control embodiment, at the machine side of converter 30, the position of the AC output voltage vector is controlled with respect to the DC voltage vector at the grid side. Another converter such as a DC to AC converter 31 may be used to convert the power from converter 18 before supplying the power to grid 20 through any appropriate components such as transformer 33 and filters (not shown), for example.

Figure 6:
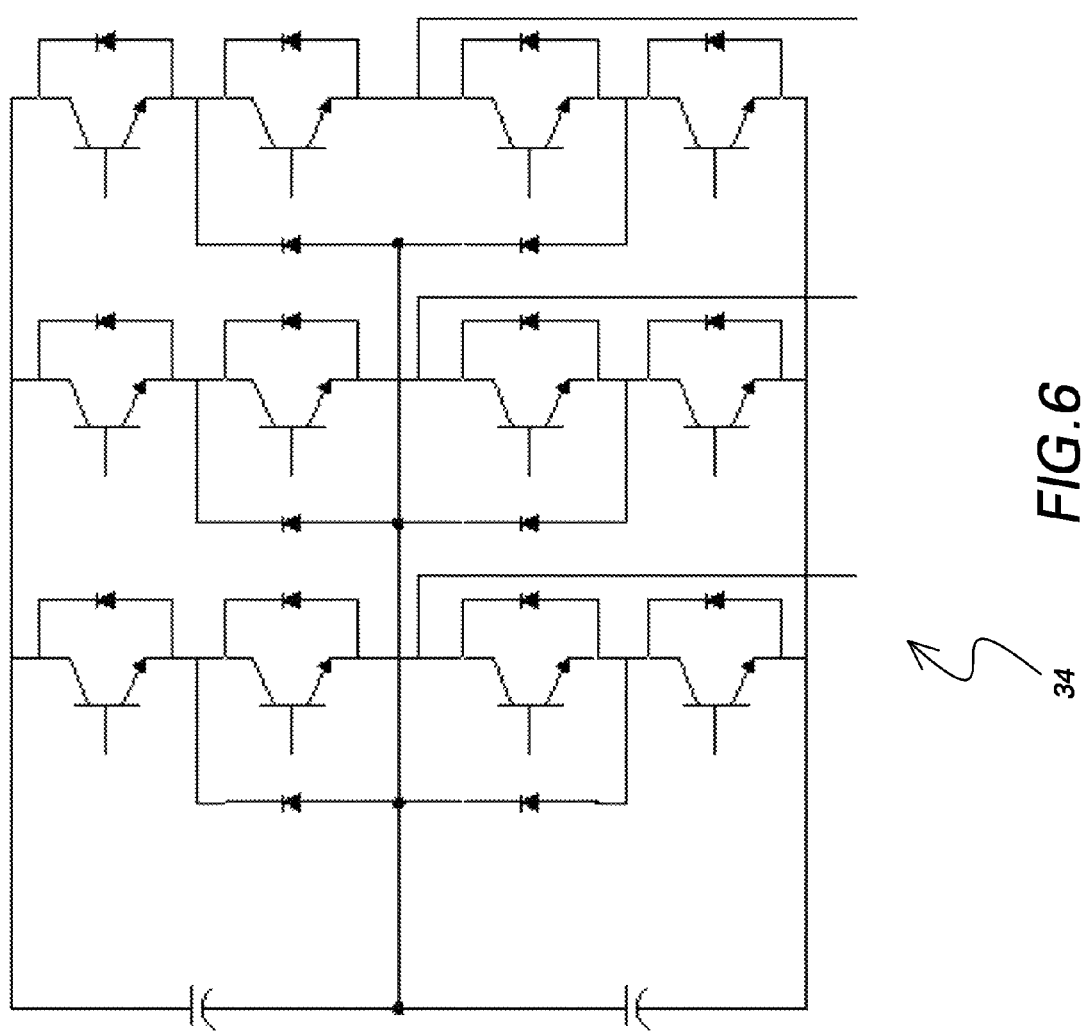
FIGS. 6-8 are circuit diagrams representative of several power electronic converter alternatives for the embodiment of FIG. 1.
Figure 8:
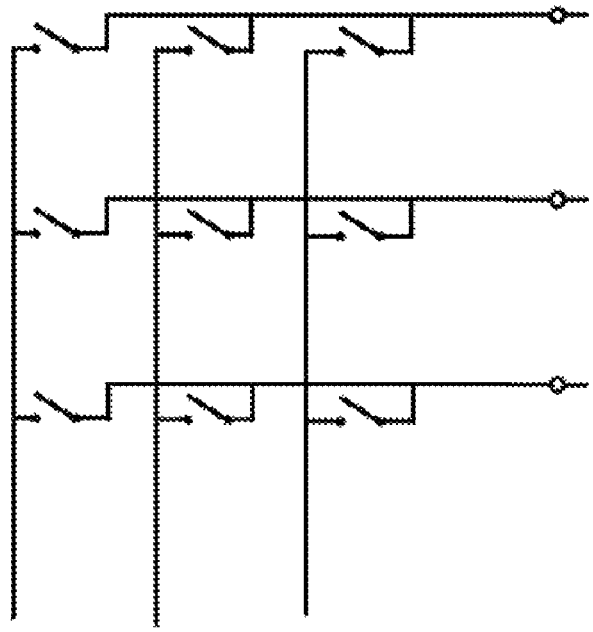
Figure 7:
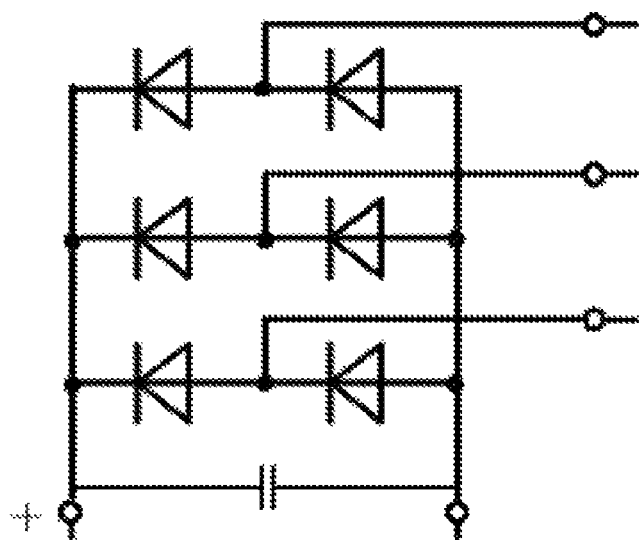

FIGS. 6-8 are circuit diagrams representative of several power electronic converter embodiments. FIG. 6 illustrates a switch-controlled power electronic converter 34. In a more specific embodiment, converter 34 converts power from machine 14 to grid 20 while additionally controlling current through machine 14 (shown in FIG. 1). Switch-controlled embodiments are particularly useful when magnetic geared machines are used because switching enables forced commutation (which in turn enables more cost effective operation). In one forced commutation mode, voltage and current vectors are actively positioned in all quadrants. In another specific forced commutation mode, the stator current has only a quadrature axis component.

In an alternative embodiment, the power electronic converter comprises an uncontrolled diode rectifier 36 as shown in FIG. 7. As yet another option, in the embodiment of FIG. 8, the power electronic converter comprises an AC to AC converter 32.

Referring again to FIG. 1, power generation system 10 may further comprise a protection assembly 38 which may comprise one or more of the protective elements discussed below. In one embodiment wherein reactive power supply assembly 16 comprises capacitor bank 22, the protection assembly comprises a plurality of over-voltage protectors 40 coupled in parallel to respective capacitors 24 of capacitor bank 22. In a more specific embodiment, over-voltage protectors 40 comprise varistors. Varistors are useful in the event that any over-current protector of the various types discussed below trips and causes over-voltage conditions.

In another embodiment, protection assembly 38 comprises an over-current protector 42 in series with reactive power supply assembly 16. Over-current protector 42 may comprise one or more fuses, circuit breakers, controllable contactors, or combinations thereof, for example. In embodiments wherein a plurality (not shown) of over-current protectors are used, such over-current protectors may optionally be coupled in parallel or in series to isolate the capacitors in case of a short circuit taking place at the terminal capacitor connections or the connecting generator busbar or cables.

In still another embodiment, protection assembly 38 comprises a crowbar 44 in parallel with the reactive power supply assembly 16. Crowbar 44 may comprise a thyristor 46 and a resistor 48 coupled in series, for example, and is useful to prevent transient oscillations between machine 14 and capacitors 24 and to increase the damping behavior of the resulting circuit under fault conditions.

In yet another embodiment, power generation system 10 further comprises a series reactance 50 coupled between the power electronic converter and a point of common coupling 39 of the crowbar and the electrical machine. In one embodiment, the series reactance is situated down tower (meaning on the ground or on the platform (not shown) supporting the tower) with respect to prime mover 12, machine 14, and reactive power supply assembly 16. Series reactance 50 may comprise a discrete element or the cabling of power generation system may be designed to provide an appropriate reactance.

In another embodiment, an additional over-current protector 43 is coupled in series with power electronic converter 18 in case of failure. In another embodiment, the converter itself includes self-protection features (not shown) such as a current sensor and control to block semiconductor triggering in case of over-current conditions. In still another embodiment, conventional protective measures such as pitch-actuators (not shown) are used. Additionally, parameters such as phase currents, output voltage, leakage current, capacitor temperature, rotor shaft position, and winding temperatures, for example, may be monitored and controlled by conventional techniques. As another example, in embodiments wherein converter 18 includes a DC link 49, a brake chopper 45 may be coupled to DC link 49 of converter 18. Brake chopper 45 may be used to absorb excess energy from the DC link.

Figure 9:
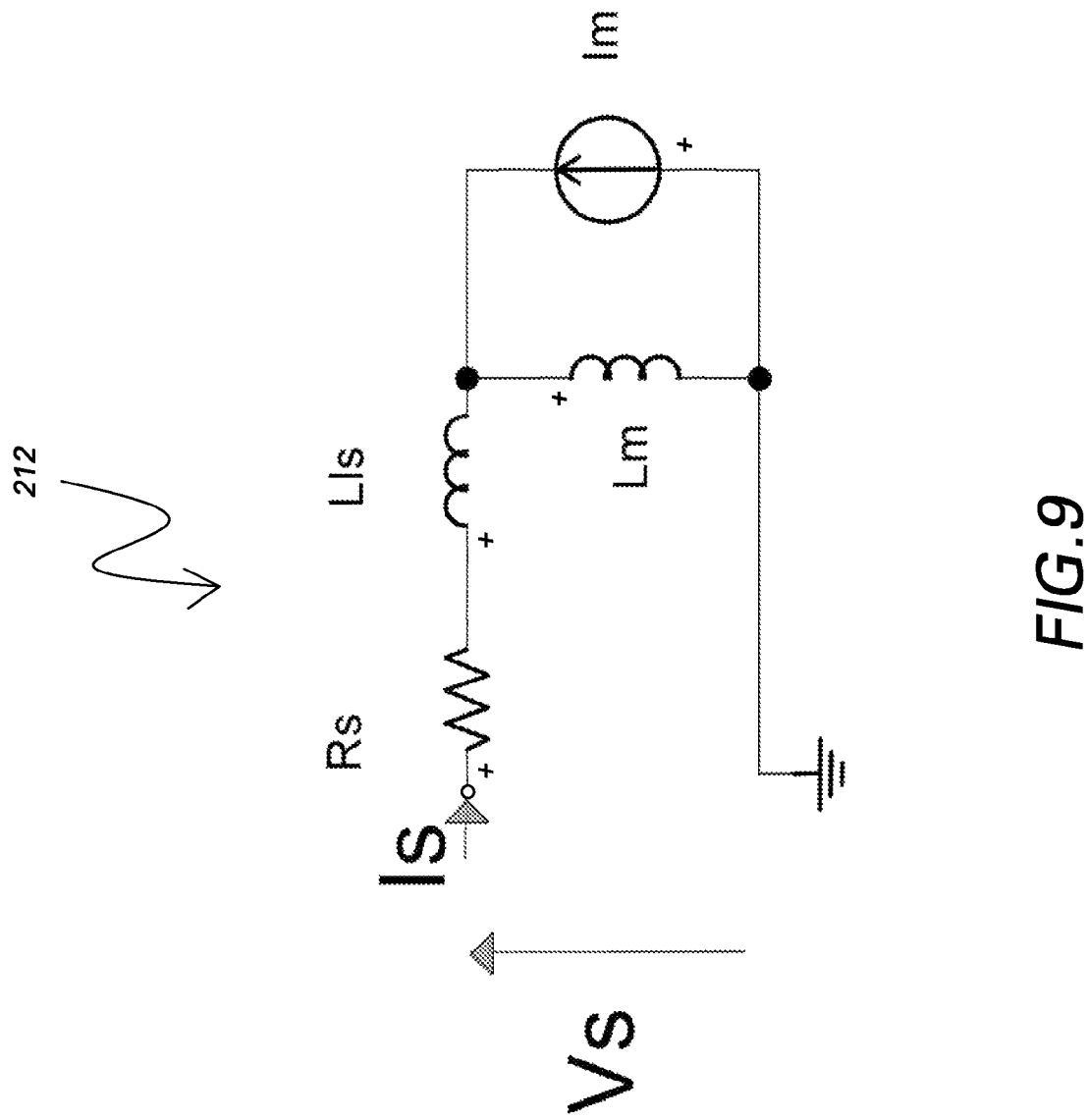
FIG. 9 is a simplified equivalent circuit diagram of a magnetically geared machine.

FIG. 9 is a simplified equivalent circuit diagram of a magnetically geared machine 212. In an embodiment with a three meter stack length and four megawatt rated power, it is estimated that the rated power factor will be 0.29. As the average air-gap diameter increases, the envelope of shear stress increases monotonically with gear ratio while the power factor decreases with it.

In the diagram of FIG. 9, the stator current Is in phase "a" leads the effective magnet current Im by an angle β with the relation being illustrated in the following equation $$\bar{I}_s = I_s e^{j\beta} = \frac{1}{\sqrt{2}}(i_d + ji_q),$$

and the back EMF being given by $$\bar{E}_m = j\omega_s L_m I_m.$$

The steady state torque is expressed as:

$$T = \frac{3}{2} p L_m I_s I_m \sin\beta,$$

wherein p represents the number of machine pole-pairs. For a given stator current, torque magnitude is maximized for $\beta=\pi$ (leading by ninety degrees).

If power electronics alone were to supply the reactive power needed, it should be rated for a total apparent power of $$S = \frac{P}{\cos\varphi}$$

which in the example is 4 MW/0.29=13.8 MVAr (or, 3.5 times larger than the active power that need really be transferred by the converters).

Instead, a more cost effective solution is to use passive VAr compensation from capacitors (as shown in FIG. 1). Using the equation:

$$Q = P \cdot \tan\varphi,$$

a rating of 13.2 MVAr results. Passive compensation is sometimes a challenge for arbitrary variable speed operation and generation if the power delivered and the machine terminal voltages are linear. However, the particular torque-speed curves intrinsic to wind power generation enable a favorable design of passive VAr compensation. In a wind turbine, the stationary power captured is given by $$P_{wind} = C_p(\lambda, \beta)\frac{1}{2}\rho A v^3$$

where v is the wind speed, A the rotor swept area, $\rho$ the air density, and where the dimensionless rotor power coefficient $C_p$ is a function of tip speed ratio $\lambda=\omega R/v$ and blade pitch angle $\beta$ and is upper bounded by a fundamental physical value of 16/27=0.593 (called the Betz limit). Thus, the stationary torque transmitted to the MGG in a wind application is at most quadratic in angular speed $\omega$, and a favorable dimensioning of the power generation system may be achieved with the magnetically geared generator and passive VAr compensation.

When direct drive generators are used in conventional wind turbine systems, either with permanent magnet excitation or with separate field excitation, the torque density along the air-gap periphery is relatively low and hence the machine size and weight is disproportionately large. The above disclosed embodiments are believed to be particularly useful for wind turbine applications because the magnetically geared generator has a high power density without the need for a gearbox or a mechanical speed adaptor (and thus with smaller dimensions, less mass, and lower cost). As described in aforementioned U.S. 20070186692, the torque density provided by magnetically geared machines allows for a significant reduction in machine size, resulting in a cost and mass savings. When the reactive power supply assembly features of the embodiments disclosed herein are added, the low power factor effect can be reduced.

Figure 10:
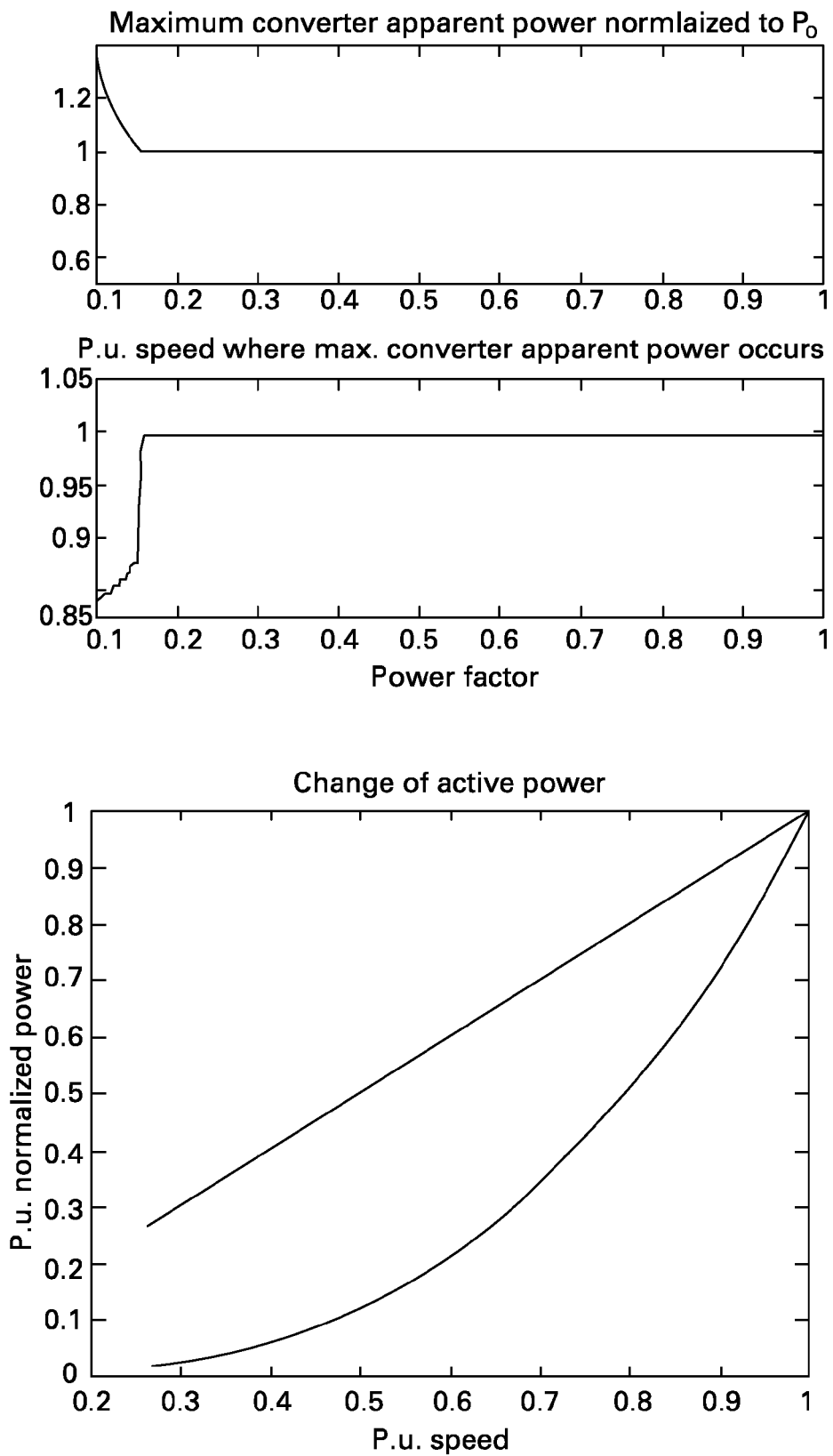
FIG. 10 is a simulated graph illustrating change in active power for a conventional wind power curve under linear and non-linear conditions as well as maximum converter apparent power and per unit speeds.

The graph on the left side of FIG. 10 shows the power generation (normalized to full power) of a system producing power linearly with speed compared to a typical scenario of a wind power generator (2.x curve). For the latter case, the right upper plot shows the maximum converter apparent power required across all operating speeds, as a function of the nominal power factor of the MGG. The right lower plot shows at which per unit speed (referred to nominal full speed) the maximum of the upper curve takes place. For all power factors larger than 0.2, the maximum apparent power required is 1 (in p.u.) and the speed at which it takes place is also 1 (in p.u.). As can be seen from the graphs, capacitors can economically be used to compensate across the entire operating range of a wind turbine, provided the MGG has a PF not less than 0.2.

Figure 11:
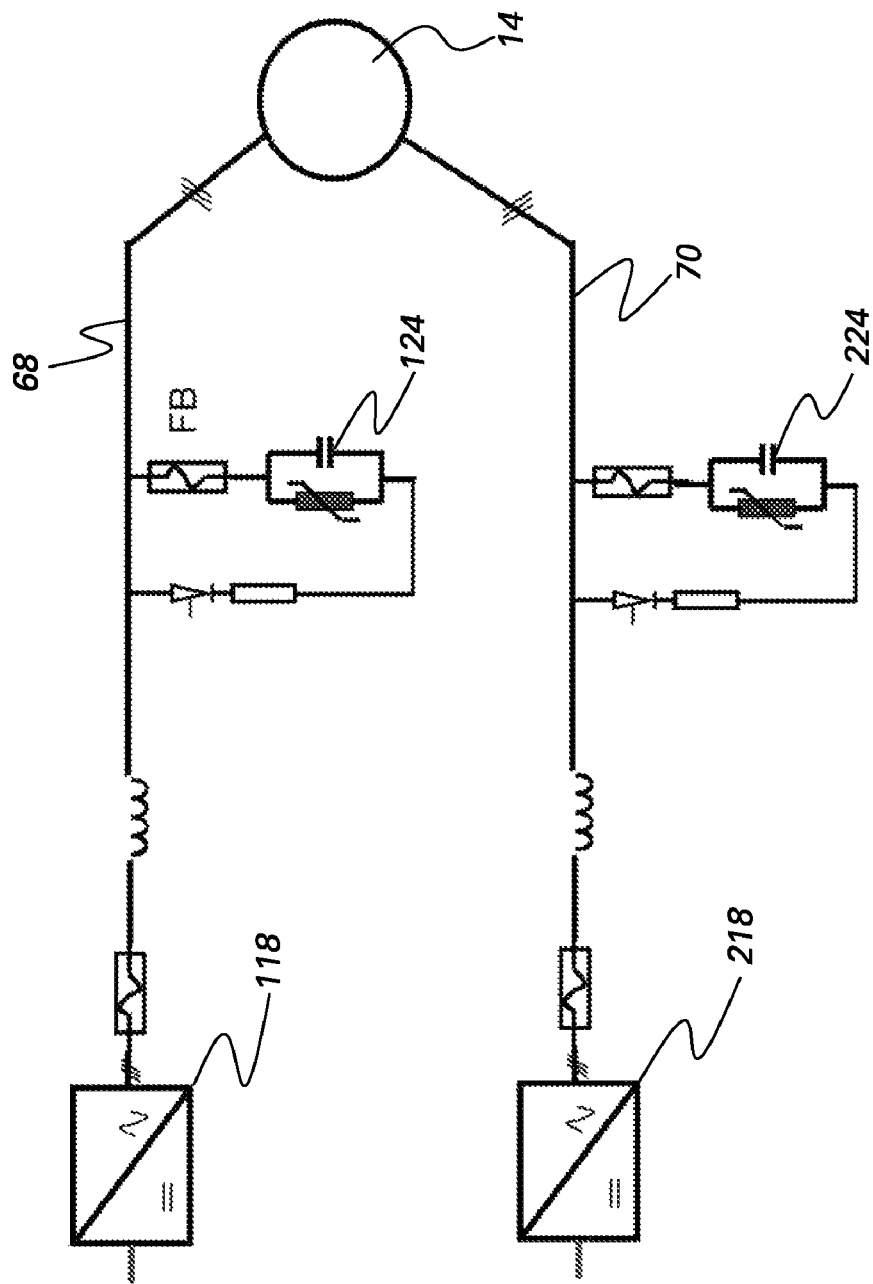
FIG. 11 is a block diagram of a power generation system in accordance with another embodiment disclosed herein.

FIG. 11 is a block diagram of a power generation system 110 in accordance with another embodiment disclosed herein. Although three phase embodiments have been described above, other options are also applicable. For example, FIG. 11 is a block diagram illustrating a multi-thread arrangement with two three phase threads 68 and 70 for a total of six phases. For simplicity, capacitor banks are represented by single capacitors 124, 224. Such embodiments are beneficial if redundancy is needed in case one converter 118 or 218 fails, or if the power rating of a single converter is too low (and the power electronic converters can thus benefit from operating in parallel).

Embodiments disclosed herein may be combined to provide compact, lightweight, reliable, and economic generation of electric power from a variable speed turbine such as a wind turbine or a hydro turbine, for example, while exploiting the intrinsic properties of variable speed generation common to such turbines. Such embodiments are also expected to be useful in applications wherein the electrical machine comprises a ship propulsion motor 114 (FIG. 5), for example.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A power generation system comprising:
a prime mover;
an electrical machine coupled to the prime mover and configured for converting mechanical power to electrical power, the electrical machine comprising a magnetically geared qenerator;
a reactive power supply assembly coupled to the electrical machine and configured to supply reactive power to the electrical machine;
a power electronic converter coupled to the reactive power supply assembly and configured for transferring power from the electrical machine to a grid.

2. The power generation system of claim 1 wherein the magnetically geared generator has a power factor of less than or equal to 0.7.

3. The power generation system of claim 1 wherein the prime mover comprises a wind turbine or a hydro turbine.

4. The power generation system of claim 1 wherein the reactive power supply assembly comprises a passive assembly.

5. The power generation system of claim 4 wherein the reactive power supply assembly comprises a capacitor bank comprising a plurality of capacitors coupled in parallel.

6. The power generation system of claim 1 wherein the reactive power supply assembly comprises a synchronous machine, or an additional power electronic converter.

7. The power generation system of claim 2 wherein the power electronic converter comprises an AC to DC converter.

8. The power generation system of claim 7 wherein the power electronic conveter further comprises a DC to AC converter coupled between the AC to DC converter and the grid.

9. The power generation system of claim 2 wherein the power electronic converter comprises an AC to AC converter.

10. The power generation system of claim 2 wherein the power electronic converter comprises a switch controlled power electronic converter.

11. The power generation system of claim 5 further comprising a protection assembly.

12. The power generation system of claim 11 wherein the reactive power supply assembly comprises a capacitor bank and the protection assembly comprises a plurality of over-voltage protectors coupled in parallel to respective capacitors of the capacitor bank.

13. The power generation system of claim 12 wherein the over-voltage protectors comprise varistors.

14. The power generation system of claim 11 wherein the protection assembly comprises an over-current protector in series with the reactive power supply assembly.

15. The power generation system of claim 14 wherein the over-current protector comprises a fuse, a circuit breaker, a controllable contactor, or combinations thereof.

16. The power generation system of claim 12 wherein the protection assembly comprises a crowbar coupled in parallel with the reactive power supply assembly.

17. The power generation system of claim 16 wherein the crowbar comprises a thyristor and resistor coupled in series.

18. The power generation system of claim 16 further comprising a series reactance coupled between the power electronic converter and a point of common coupling of the crowbar and the electrical machine.

19. A power generation system comprising:
a wind driven turbine;
a magnetically geared generator coupled to the wind driven turbine;
a reactive power supply assembly coupled to the magnetically geared generator and configured to supply reactive power to the electrical machine;
a power electronic converter coupled to the reactive power supply assembly and configured for transferring power from the magnetically geared generator to a grid.

20. The power generation system of claim 19 wherein the reactive power supply assembly comprises a capacitor bank comprising a plurality of capacitors coupled in parallel.

21. The power generation system of claim 20 further comprising a protection assembly comprising a plurality of over-voltage protectors coupled in parallel to respective capacitors of the capacitor bank, or an over-current protector in series with the reactive power supply assembly, or a crowbar coupled in parallel with the reactive power supply assembly, or combinations thereof.

22. A power generation system comprising:
a prime mover;
a magnetically geared generator coupled to the prime mover;
a power electronic converter configured for transferring active power from the magnetically geared generator to a grid and for supplying reactive power to the magnetically geared generator.

23. The power generation system of claim 22 wherein the prime mover comprises a wind driven turbine.

24. The power generation system of claim 22 wherein the magnetically geared generator comprises a moveable rotor having a first magnetic field associated therewith, a stator configured with a plurality of stationary stator windings therein, and a magnetic flux modulator interposed between the moveable rotor and the stator windings, wherein the magnetic flux modulator is configured to transmit torque between the first magnetic field associated with the moveable rotor and a second magnetic field excited by the plurality of stationary stator windings.

* * * * *

UNITED STATES PATENT AND TRADEMARK OFFICE
CERTIFICATE OF CORRECTION

PATENT NO.        : 8,044,527 B2
APPLICATION NO.   : 11/861759
DATED             : October 25, 2011
INVENTOR(S)       : Mari et al.

It is certified that error appears in the above-identified patent and that said Letters Patent is hereby corrected as shown below:

In Column 3, Line 1, delete "Power system" and insert -- Power generation system --, therefor.

In Column 8, Line 7, delete "110" and insert -- 10 --, therefor.

In Column 8, Line 39, in Claim 1, delete "qenerator;" and insert -- generator; --, therefor.

In Column 8, Line 63, in Claim 8, delete "conveter" and insert -- converter --, therefor.

Signed and Sealed this
Fifth Day of June, 2012

David J. Kappos
*Director of the United States Patent and Trademark Office*